(12) United States Patent
Bartscht et al.

(10) Patent No.: US 9,719,783 B2
(45) Date of Patent: Aug. 1, 2017

(54) LEVEL SENSOR

(71) Applicant: Hella KGaA Hueck & Co., Lippstadt (DE)

(72) Inventors: Manfred Bartscht, Salzkotten (DE); Thomas Elpermann, Telgte (DE); Eckart Wirries, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 202 days.

(21) Appl. No.: 14/412,319

(22) PCT Filed: Jun. 29, 2013

(86) PCT No.: PCT/EP2013/063763
§ 371 (c)(1),
(2) Date: Dec. 31, 2014

(87) PCT Pub. No.: WO2014/005964
PCT Pub. Date: Jan. 9, 2014

(65) Prior Publication Data
US 2015/0185005 A1 Jul. 2, 2015

(30) Foreign Application Priority Data
Jul. 5, 2012 (DE) .................. 10 2012 106 021

(51) Int. Cl.
*G01C 9/02* (2006.01)
*G01C 9/06* (2006.01)
(Continued)

(52) U.S. Cl.
CPC ............... *G01C 9/02* (2013.01); *G01C 9/06* (2013.01); *G01D 11/30* (2013.01); *G01D 5/12* (2013.01)

(58) Field of Classification Search
CPC ........... G01D 11/30; G01D 5/12; G01C 9/06; G01C 9/28
(Continued)

(56) References Cited

U.S. PATENT DOCUMENTS 6,354,162 B1 * 3/2002 Bobay .................... G01D 11/30
310/68 B
6,491,505 B1 * 12/2002 Hueser .................... F04C 23/00
417/312

(Continued)

FOREIGN PATENT DOCUMENTS

DE 19733719 C1 4/1999
DE 19811431 A1 9/1999
(Continued)

*Primary Examiner* — R. A. Smith
*Assistant Examiner* — Tania Courson
(74) *Attorney, Agent, or Firm* — Husch Blackwell LLP

(57) ABSTRACT

A level sensor (20) for a motor vehicle that comprises a housing (1), a rotor (2) that is rotatably mounted on the housing (1), a circuit board (3) that is enclosed by the housing (1) and contains at least a single stator as well as a connector (4). The level sensor (20) should be improved in such a way that the rotor (2) is easy to mount on the housing (1) and that there is practically no play so that a relative position of the stator as compared to a rotor structure (9) is largely maintained. Overall, the sensor should also be inexpensive to manufacture. This is achieved by the circumstance that the housing (1) exhibits a cylinder (6) with a circular cross-section that is mounted on the outside, that the rotor (2) is made of plastic with the exception of the rotor structure (9) and that the rotor (2) is guided within the cylinder (6) and interlocks with the latter.

9 Claims, 3 Drawing Sheets

(51) Int. Cl.
*G01D 11/30* (2006.01)
*G01D 5/12* (2006.01)

(58) Field of Classification Search
USPC .................................. 33/1 PT, 1 N, 365, 534
See application file for complete search history.

(56) References Cited

U.S. PATENT DOCUMENTS

| | | | |
|---|---|---|---|
| 7,015,688 B2* | 3/2006 | Wolber | H03K 17/97 324/207.2 |
| 9,316,497 B2* | 4/2016 | Bartscht | G01C 9/06 |
| 2003/0182810 A1* | 10/2003 | Sano | B62D 15/02 33/1 PT |
| 2004/0244210 A1* | 12/2004 | Harrer | G01D 5/264 33/1 PT |
| 2004/0257068 A1 | 12/2004 | Wolber et al. | |
| 2010/0102496 A1* | 4/2010 | Taniguchi | B23Q 11/127 269/55 |
| 2014/0161640 A1* | 6/2014 | Geue | F04C 29/066 417/312 |
| 2014/0312885 A1* | 10/2014 | Vellaiyanaicken | G01D 5/2046 324/207.25 |
| 2015/0047212 A1* | 2/2015 | Bartscht | G01C 9/06 33/366.11 |
| 2015/0160041 A1* | 6/2015 | Hikichi | G01D 5/34707 324/207.25 |
| 2015/0168140 A1* | 6/2015 | Elpermann | G01D 5/24442 73/431 |

FOREIGN PATENT DOCUMENTS

| | | | | |
|---|---|---|---|---|
| DE | 102010009497 A1 | | 9/2011 | |
| DE | 102012101962 | * | 9/2013 | ............... G01C 9/06 |
| EP | 943469 A2 | | 9/1999 | |
| EP | 1376077 A2 | | 1/2004 | |

* cited by examiner

LEVEL SENSOR

CROSS REFERENCE

This application claims priority to PCT/EP2013/063763, filed Jun. 29, 2013, which itself claims priority to Gelman Application No. 10 2012 106021.5.1, filed Jul. 5, 2012, which are both hereby incorporated by reference.

FIELD OF TECHNOLOGY

The invention concerns a level sensor for a motor vehicle.

BACKGROUND

Such level sensors are generally known in accordance with the current state-of-the-art and are mainly used in motor vehicles in order to relatively determine rotary or sliding motions between two parts, for example to determine the vehicle's bank angle and to control the headlights accordingly.

EP 943 469 A describes a sensor with two circuit boards being mounted in a single housing. In this example, sealing the housing is a very complex process due to the very large cover/lid and the opening for the rotor. The rotor comprises a shaft made of metal and is assembled from a relatively high number of individual parts. Manufacture and assembly of the sensor are therefore quite expensive.

DE 19733719 C1 describes a sensor where a rotor is connected to a housing by means of a ball joint A seal is positioned between the rotor and the housing. The construction itself is relatively complex; play between the parts cannot be completely avoided, which has a correspondingly adverse effect on the mutual positioning of a stator and rotor structure.

SUMMARY OF THE INVENTION

It is therefore the objective of this invention to provide a level sensor where a rotor is easily mounted on a housing and where there is practically no play so that a relative position of a stator in relation to a rotor construction is accurately maintained for the most part. Overall, the sensor should also be inexpensive to manufacture.

The housing has an externally mounted cylinder with the cross-section shaped in the form of a circular ring. Here, the cylinder is arranged on one wall of the housing in such a manner that it is closed up by the cylinder bottom. The housing is therefore in tight contact with the cylinder so that any electronics arranged inside the housing are protected against the ingress of moisture and dirt from the outside. The housing with the cylinder can, for example, just be made of plastic by injection molding.

The rotor, with the exception of the rotor structure, can be made out of plastic as well. This rotor can also be easily manufactured via injection molding; the rotor structure is mounted at a predetermined position of the rotor.

The rotor is contained within the cylinder and interlocked there. In this way, the rotor structure can securely be held at a predetermined position in relation to a stator. The rotor is mounted to the housing by simply pressing it into the cylinder until the latching elements lock into place; additional fastening parts are not required.

Overall, it is possible to manufacture this level sensor in an economical fashion.

In one development, a circular locking groove is recessed into the outside of the cylinder. When used in conjunction with a corresponding latching nose on the rotor, the rotor is secured for rotary movements and, at the same time, braced as well as locked in place inside the cylinder at a predetermined position.

In a further development, a pipe piece is mounted on the end of the rotor that faces away from the rotor structure, which has a latching nose corresponding with the locking groove at its bottom side. The pipe piece is therefore positioned over a portion of the cylinder and thereby seals it off from the outside. This results in an additional guiding measure, whereas dimensions should be chosen in such a manner that the latching nose is pressed against the locking groove with a predetermined degree of prestressing.

In a further development, the rotor is made of plastic with a certain proportion of embedded lubricant; this lubricant is a synthetic material with a particularly low coefficient of friction, such as PTFE. This reduces the level of friction between the rotor and cylinder.

In a further development, there is at least one stage on the inner wall of the cylinder.

Furthermore, at least a second stage can be formed on the shell of the rotor's cylindrical part.

This allows improved compensation for manufacturing tolerances, meaning that the guidance of the rotor within the cylinder is improved further.

In a further development, the cylindrical part is equipped with fins/webs. This causes additional reinforcement so that the cylindrical part can be designed with a lower wall thickness. This means that, overall, material is saved.

In a further development, surfaces or areas where the cylinder and rotor come into contact must be provided with a lubricant. This further reduces friction.

In a further development, one circular cam each is provided on the upper end of the cylinder and the transitional area between the cylindrical part (2a) and the pipe piece. This prevents the rotor from being pushed too deeply into the cylinder during the installation process and thereby destroying a part of the housing that opposite of the base of the rotor.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
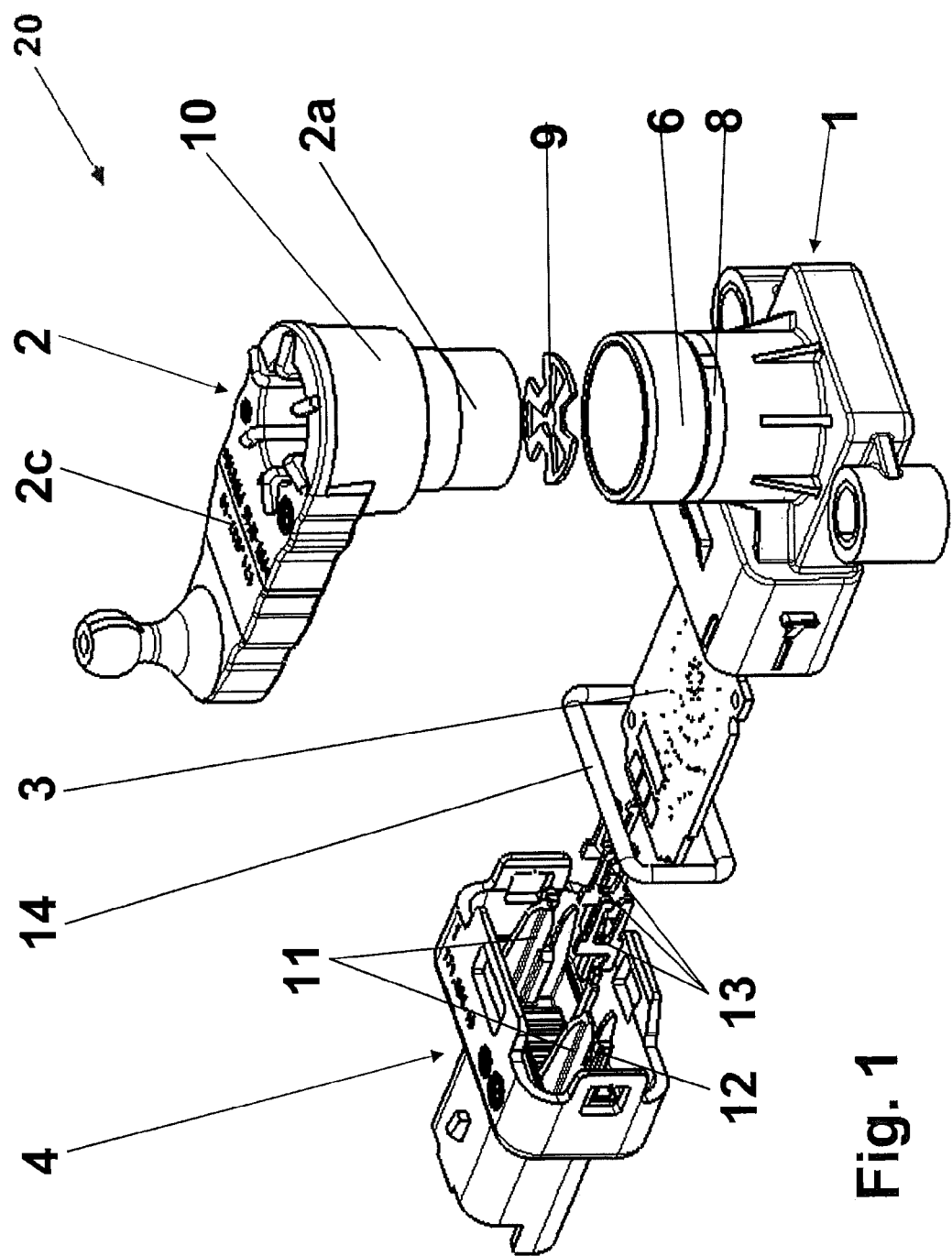
FIG. 1 shows an exploded perspective view of the level sensor.
Figure 2:
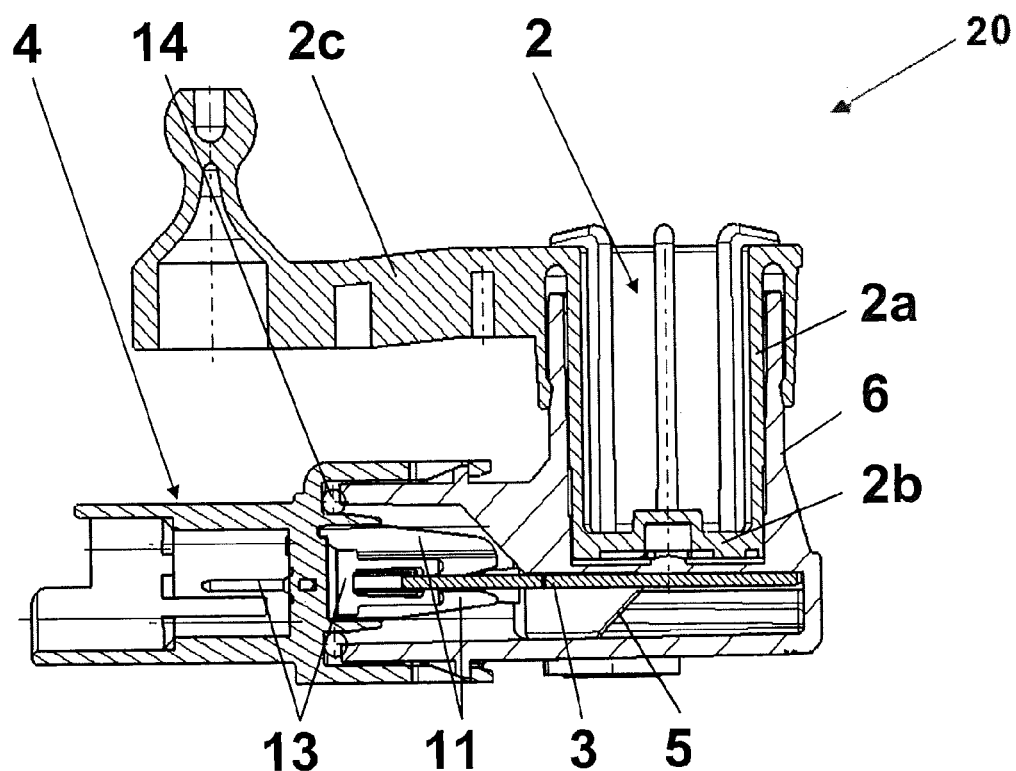
FIG. 2 shows a vertical cross-section of the level sensor.
Figure 3:
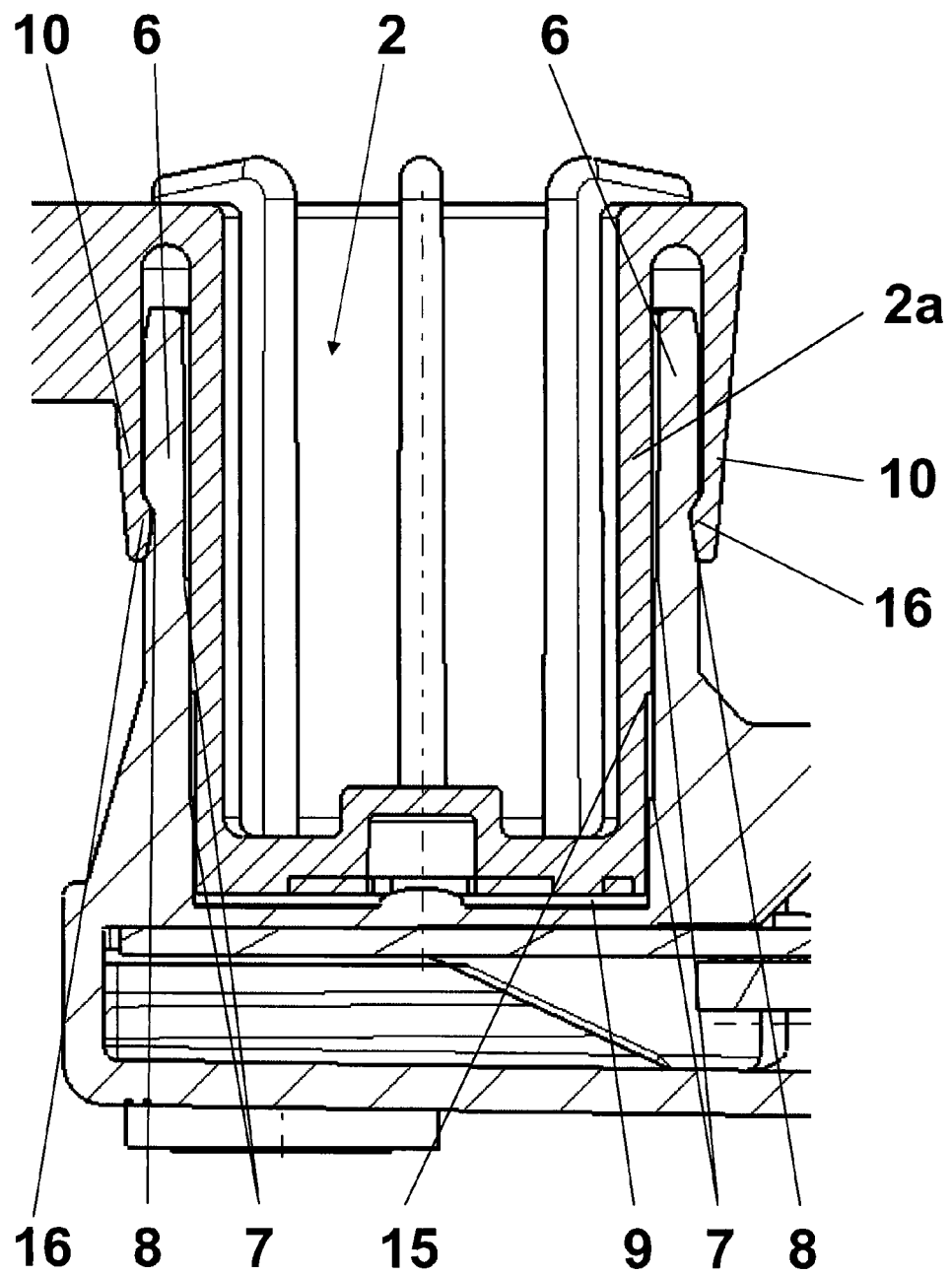
FIG. 3 shows a vertical cross-section of the cylinder and rotor as a detailed drawing.

As shown by FIGS. 1 to 3, a level sensor (20) in accordance with the first design example comprises a housing (1), a rotor (2), a circuit board (3) and a connector (4).

The housing (1) includes a chamber (5) as well as a cylinder (6) with a cross-section in the shape of a circular ring positioned on the outside of the chamber (5). The chamber (5) is closed on all sides, except for an opening located on the broad side of the housing (1). The chamber (5) is fundamentally rectangular when viewed as a horizontal section; it exhibits two different heights in a longitudinal section as is shown particularly well by FIG. 2. In this regard, the lower height is attributed to the cylinder (6) and the higher one is assigned to the opening. In other words: the cylinder (6) is positioned above the part of the chamber (5) with the smaller cross-section while the opening has the larger cross-section.

On the inside of the chamber (5), there are guide ramps on the longitudinal sides of the section with the lower height, which first move upward at an oblique angle when viewed from the opening, meaning in the direction of the cylinder (6), and then extend in parallel to the upper boundary of the chamber (5) at a predetermined height. In this regard, the clear distance between the upper boundary and the guidance ramps correspond to the thickness of the circuit board (3) plus a predetermined level of play. This ensures that the required distance between the rotor (2) and a stator is always maintained. Deformable structures are provided on the areas of the guide ramps that are facing the upper boundary, for example in the form of thin lamellae.

The cylinder (6) has two circular stages (7) on the inside of its walls. These are designed in such a way that the cross-section of the cylinder (6) becomes slightly smaller with each of the stages (7) from the open upper end to the lower end closed off by the wall of the chamber (5). A small "bump" is provided centrally on the closed end in the form of a spherical cap.

A circular locking groove (8) is recessed on the outside of the cylinder's (6) wall. The locking groove (8) is positioned in a lower area of the upper half of the cylinder (6). A cross-section of the locking groove (8) roughly corresponds to the shape of a flat unequal-sided triangle with the longer, lower side of the triangle is approximately three times as long as the shorter, upper side.

The connection between the cylinder (6) and the wall of the chamber (5) is reinforced by supporting fins/ribs, which are integrally formed on the outside of the wall and in the lower area of the cylinder (6).

The rotor (2) consists of a cylindrical part (2a) with a base (2b). There is a lever arm (2c) on the upper end of the cylindrical part (2a) opposite from the base (2b). There are also fins/ribs on this component in order to reinforce the cylindrical part (2a). A rotor structure (9) is arranged on the outer side of the base (2b). This structure is, for example, mounted in the form of a stamped sheet or conducting path foil. A circular second stage (15) is arranged on the outside of the cylindrical part (2a) in such a manner that the outer diameter of the cylindrical part decreases towards the base (2b).

The cylindrical part (2a) of the rotor (2) is rotatably mounted in the cylinder (6) of the housing (1) and latched in place there. For this purpose, a pipe piece (10) is arranged in such a way on the upper end of the cylindrical part (2a) that it surrounds the upper area of the cylindrical part (2a) at a certain distance. This distance corresponds to the wall thickness of the cylinder (6) plus a predetermined level of play. A circumferential latching nose (16) is provided at the lower end of the pipe piece (10) so that it faces inward and corresponds to the locking groove (8). There is no play between the locking groove (8) and the latching nose (16), but rather a slight degree of prestressing.

The rotor (2) with the pipe piece (10) are made of plastic with embedded PTFE.

The first and second stages (7 and 15) ensure a reliable guidance of the rotor (2) inside the cylinder (6) with a minimal degree of possible play and also serve to reduce friction.

To further reduce friction, areas and surfaces where the rotor (2) and the cylinder (6) come into contact are provided with a lubricant, for example silicone grease. These areas particularly include the locking groove (8) and the components of the cylinder's (6) inner surface.

The circuit board (3) contains the stator in the form of conducting path structures as well as electric and/or electronic components, while the stator corresponds to the rotor structure (9) in the assembled state. chamber (5). The corresponding side of the connector (4) is therefore designed in such a way that it can be put over the housing (1) in the area of the opening with only little play. The connector (4) and the housing (1) can be interlocked and every connector is provided with 4 locking hooks while the corresponding latching noses are arranged on the housing (1). The circuit board (3) is mounted on the cover-like portion of the connector (4) and in contact. For this purpose, two retaining tabs (11), two holding fingers (12) and three contact studs (13) are arranged on the cover side of the connector (4).

The retaining tabs (11) and the holding fingers (12) are an integral part of the connector (4). Every retaining tab (11) has a central slot so that it can circumferentially clamp the peripheral area of the circuit board (3). The holding fingers (12) serve the purpose of providing lateral guidance and positioning the circuit board (3) inside the connector (4).

The retaining tabs (13) are made of metal and fastened inside the connector (4). On the cover side, every contact stud (13) has slots, similar to the retaining tabs (11), whereas the fingers formed in this way are bent towards one another at their free ends. These free ends are in contact with the clamping contact surfaces on the circuit board (3). On the connector side, the contact studs (13) are designed to fit common plug connectors.

In order to seal the chamber (5), an O-ring (14) or molded seal is arranged in the area of the opening (7) between the housing (1) and the connector (4).

Figure 4:
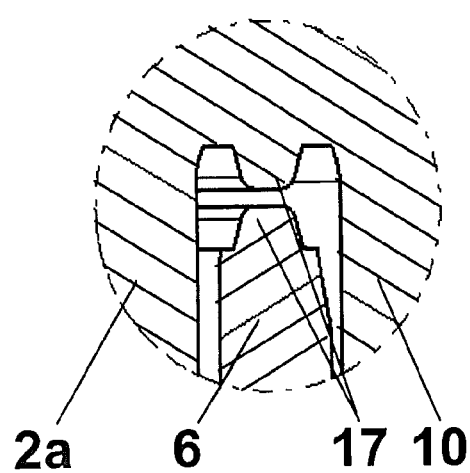
FIG. 4 shows a detailed cross-section of a second design (execution) example with regard to the invention.

A second design example is shown in FIG. 4, wherein only the upper end of the cylinder (6) as well as an adjoining part of the rotor (2) are displayed in detail and enlarged. The second design example only differs from the first one by one circular cam (17) each being mounted on the upper free end of the cylinder (6) in an upward facing direction and in the transition area between the cylindrical part (2a) and the pipe piece (10) in a downward facing direction. The cam (17) has a trapezoidal shape when viewed as a cross-section and extends along the entire circumference of the cylinder (6) or along the transitional area, respectively. The cams (17) are opposite from each other—if the rotor (2) is correctly assembled at a short distance.

Regarding the production process of the level sensor (20), the individual components are manufactured first. The housing (1), the rotor (2) and the connector (4) are separately made out of plastic by injection molding, while the contact studs (13) are attached to the connector (4). The rotor structure (10) is either created during the injection molding process of the rotor (2) or fitted to its base (2b) after that process.

The circuit board (3) is attached to the connector (4) by sliding it into the slot with the predetermined side facing forward until it reaches a positioned predetermined by the holding fingers (12) and stops in place there. In this context, the circuit board (3) is clamped to the connector (4) the contact studs (13) are in contact with the associated contact surfaces of the circuit board (3).

The connector (4) with the circuit board (3) is fastened to the housing (1). For this purpose, the circuit board (3) is pushed into the chamber (5) through the opening. The edges of the circuit board (3) slide along the guide ramps and proceed to deform the deformable structures there, if applicable. The holding fingers (12) slide along the fins/ribs (15) and are thereby pressed against the circuit board (3). Again, the deformable structures are deformed here, if applicable. The deformable structures thereby prevent any play between the circuit board (3) and the fastening means holding that component in place so that the stator maintains an exactly predetermined position. The latching hooks of the connector (4) engage with the latching noses of the housing (1) so that it is tightly and securely closed.

The locking groove (8) and other predetermined portions of the cylinder's (6) inner surface are coated with a lubricant. The cylindrical part of the rotor (2) is then pressed into the cylinder (6) of the housing (1) and locks into place. In this regard, the rotor structure (10) and the stator move into predetermined relative positions that are responsible for ensuring the proper functioning of the level sensor (20).

LIST OF REFERENCE SIGNS

1 Housing
2 Rotor
2a Cylindrical part
2b Base
2c Lever arm
3 Circuit board
4 Connector
5 Chamber
6 Cylinder
7 First stage
8 Locking groove
9 Rotor structure
10 Pipe piece
11 Holding tabs
12 Holding fingers
13 Contact studs
14 O-ring
15 Second stage
16 Latching nose
17 Cam
20 Level Sensor

The invention claimed is:

1. A level sensor for a motor vehicle, comprising:
a housing including an externally mounted cylinder, wherein said cylinder has a circular cross-section,
a rotor including a cylinder part extending downwardly therefrom that is rotatably mountable within the externally mounted cylinder of the housing, and a pipe piece radially spaced outwardly from the cylinder part by a distance corresponding substantially to a wall thickness of the externally mounted cylinder; and
a circuit board including a stator at least partially enclosed by the housing,
wherein the cylinder part of the rotor is mounted within the externally mounted cylinder of the housing such that the pipe piece extends at least partially over the externally mounted cylinder of the housing,
wherein the rotor is made out of plastic with the exception of a rotor structure of the rotor.

2. The level sensor of claim 1, wherein there is a recessed circular locking groove on the outside of the externally mounted cylinder.

3. The level sensor of claim 2, wherein the pipe piece is mounted on the upper end of the rotor that is facing away from the rotor structure, and wherein the lower end of the pipe has a latching nose corresponding to the locking groove for selectively connecting the externally mounted cylinder with the cylinder part of the rotor.

4. The level sensor of claim 1 wherein the rotor is made of plastic and an embedded lubricant.

5. The level sensor of claim 1 wherein there is at least a first stage on one of the inner walls of the externally mounted cylinder.

6. The level sensor of claim 1 wherein there is at least a second stage on the outside of a shell of the rotor's cylindrical part.

7. The level sensor of claim 6 wherein the cylindrical part includes a plurality of at least one of ribs and fins.

8. The level sensor of claim 1 wherein surfaces where the cylinder and the rotor come into contact with one another are provided with a lubricant.

9. The level sensor of claim 6 wherein one circular cam is provided at the upper end of the externally mounted cylinder and a transitional area between the cylindrical part and a pipe piece.

* * * * *

UNITED STATES PATENT AND TRADEMARK OFFICE
CERTIFICATE OF CORRECTION

PATENT NO. : 9,719,783 B2
APPLICATION NO. : 14/412319
DATED : August 1, 2017
INVENTOR(S) : Manfred Bartscht, Thomas Elpermann and Eckart Wirries It is certified that error appears in the above-identified patent and that said Letters Patent is hereby corrected as shown below:

In the Specification

In Column 1, Line 6, delete "Gelman" and replace with -- German --

Signed and Sealed this
Sixth Day of February, 2018

Joseph Matal
*Performing the Functions and Duties of the*
*Under Secretary of Commerce for Intellectual Property and*
*Director of the United States Patent and Trademark Office*